UNITED STATES PATENT OFFICE.

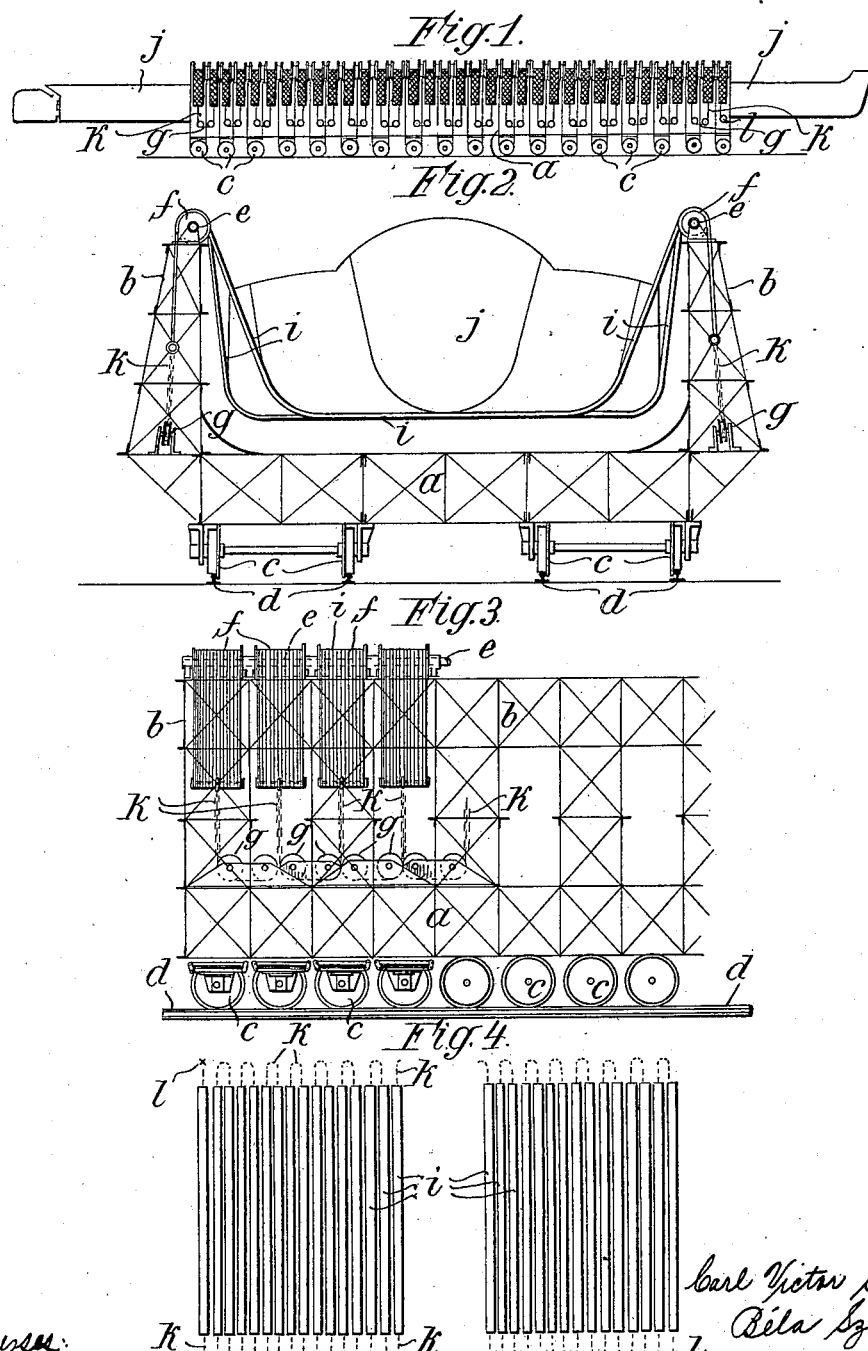

CARL VICTOR SUPPAN, OF VIENNA, AND BÉLA SZENDI, OF BUDAPEST, AUSTRIA-HUNGARY.

TRUCK FOR TRANSPORT OF SHIPS, &c.

SPECIFICATION forming part of Letters Patent No. 722,436, dated March 10, 1903.

Application filed September 5, 1901. Serial No. 74,410. (No model.)

*To all whom it may concern:*

Be it known that we, CARL VICTOR SUPPAN, residing at Vienna, and BÉLA SZENDI, residing at Budapest, Austria-Hungary, subjects of the Emperor of Austria-Hungary, have invented certain new and useful Improvements in Trucks for Transport of Ships or other Vessels, of which the following is a specification.

This invention relates to a truck for the transport of a ship or vessel along an inclined or horizontal track, the vessel being suspended by means of tension devices.

The truck, which is open at both ends and may be shorter than the vessel, is provided with tension devices, which are drawn over pulleys mounted on the sides of the truck and arranged partly transverse and partly parallel to the longitudinal axis of the truck. The ends of these devices are fastened to the truck, so that they can adapt themselves automatically to the shape of the ship resting upon them.

The accompanying drawings illustrate by way of example one form of truck of this kind for transporting a ship.

Figure 1 is a diagrammatic side view of the truck with a vessel resting in it. Figs. 2 and 3 are respectively a cross-section and a side view of the truck, drawn to a larger scale. Fig. 4 is a plan showing the carrying-bands.

$a$ is the truck-body, which is open at both ends and has two vertical sides $b\ b$. It has pairs of wheels $c$, arranged to run on rails $d$. At the upper ends of the sides $b$ pulleys $f$ are mounted on axles $e$, parallel to the longitudinal axis of the truck, and at the lower parts of the sides $b$ there are pulleys $g$, the axles of which are transverse to the longitudinal axis of the truck. Over these pulleys is drawn a tension device which has its ends attached to the truck and its middle portions $i$ hanging down between the sides $b$, so as to constitute a bed for the vessel $j$, adapting itself automatically to the form of the vessel, so that the load on the bed is distributed uniformly over the frame, the bilge, and the lateral walls of the vessel.

The parts $i$ of the tension device which pass over the pulleys $f$ and under the vessel preferably consist of bands or straps connected together by means of chains or ropes $k$, passing under the pulleys $g$. Fig. 4 shows a system of supporting-bands of this kind. $l\ l$ are the points where the ends of the tension device are fastened to the truck.

Instead of a single tension device there may be employed a number of independent tension devices having their ends fixed to the truck, each of these devices forming a bed for that part of the vessel which rests on it and adapting itself automatically to the shape of the vessel. A truck of this kind for transporting vessels, ships, can be made considerably shorter than the vessel.

As stated above, one or more tension devices may be employed, said tension device or devices constituting the cradle in which the vessel is held in suspension in the vehicle body or superstructure, the bands $i$ of the cradle or of a cradle-section being connected by chains $k$ into an endless series, the terminals of which are secured to the superstructure, the chains running under the retaining and guide rollers, the connection of the bands by the chains being clearly shown in Fig. 3, so that the cradle or its sections will automatically adjust themselves to the cross-sectional contour or outline of a vessel. Thus, for instance, a chain $g$ connects the ends of the two bands on the left, the chain on the opposite end of the first band on the left being secured to the vehicle, while the chain on the opposite end of the second band is connected to the end of the third band, and so on, forming an endless series.

When it is desired to transport a vessel by a truck of this kind, the truck is run along an incline under water and the vessel is floated over it and made fast by ropes between the two sides $b$ of the truck. The truck, along with the vessel, is then drawn out of the water, and the vessel settles down upon the tension devices $i$, first with its stem, then gradually with the middle part, and finally with the stern, in such a manner that the tension devices $i$ adapt themselves to the shape of the vessel. The reverse operation takes place when the truck, with the vessel suspended in it, is run under water, the vessel gradually floating up from the truck, commencing by the stem.

We claim—

1. A vehicle for transporting vessels provided with a suitable body or superstructure, in combination with a cradle in which a vessel is held in suspension in said superstructure and composed of flexible bands adapted to automatically adjust themselves to the cross-sectional outline of such vessel, substantially as set forth.

2. A vehicle for transporting vessels, provided with a suitable body or superstructure, in combination with a cradle in which a vessel is held in suspension in said superstructure and composed of one or more parts each formed of flexible bands connected into an endless series having fixed terminals, and pulleys suitably arranged to support, retain and guide said endless bands, for the purpose set forth.

3. A vehicle for transporting vessels, provided with a suitable body or superstructure, in combination with a cradle in which a vessel is held in suspension in said superstructure, and composed of one or more parts each formed of flexible bands connected by chains into an endless series having fixed terminals, pulleys suitably arranged to support the bands and pulleys suitably arranged to retain and guide the chains, substantially as set forth.

In testimony whereof we have hereunto set our hands in presence of two subscribing witnesses.

CARL VICTOR SUPPAN.
BÉLA SZENDI.

Witnesses as to signature of Carl Victor Suppan:
FERDINAND TOPOLANVKI,
ALVESTO S. HOGUE.

Witnesses as to signature of Béla Szendi:
PAUL J. TOMANOERY, Jr.,
A. BRONSTEIN.